(12) United States Patent
Bernhard et al.

(10) Patent No.: US 9,475,161 B2
(45) Date of Patent: Oct. 25, 2016

(54) VERTICAL MACHINING CENTRE IN GANTRY CONSTRUCTION

(71) Applicant: Maschinenfabrik Berthold Hermle AG, Gosheim (DE)

(72) Inventors: Franz-Xaver Bernhard, Spaichingen (DE); Tobias Schwörer, Königsheim (DE); Bernd Ramsperger, Gosheim (DE)

(73) Assignee: Maschinenfabrik Berthold Hermle AG, Gosheim (DE)

( * ) Notice: Subject to any disclaimer, the term of this patent is extended or adjusted under 35 U.S.C. 154(b) by 213 days.

(21) Appl. No.: 14/207,151

(22) Filed: Mar. 12, 2014

(65) Prior Publication Data
US 2014/0274627 A1    Sep. 18, 2014

(30) Foreign Application Priority Data

Mar. 12, 2013   (EP) .................................... 13001233

(51) Int. Cl.
B23Q 3/155   (2006.01)
B23Q 3/157   (2006.01)
B23Q 1/01    (2006.01)

(52) U.S. Cl.
CPC ........... *B23Q 3/15526* (2013.01); *B23Q 1/012* (2013.01); *B23Q 1/015* (2013.01);
(Continued)

(58) Field of Classification Search
CPC .......... B23Q 3/15506; B23Q 3/15526; B23Q 3/15706; B23Q 3/15766; Y10T 483/11; Y10T 483/1717; Y10T 483/175; Y10T 483/179; Y10T 483/1793; Y10T 483/1795; Y10T 483/1798; Y10T 483/18; Y10T 483/1845; Y10T 483/1855
USPC ..... 483/3, 23, 37, 54, 55, 56, 57, 58, 63, 64
See application file for complete search history.

(56) References Cited

U.S. PATENT DOCUMENTS 3,173,204 A * 3/1965 Anthony ............ B23Q 3/15546
                                                    279/126
3,273,235 A * 9/1966 Dziedzic ............ B23Q 3/15773
                                                    483/48
(Continued)

FOREIGN PATENT DOCUMENTS

CN       202612382 U  * 12/2012
DE     202011001493 U1   5/2011
(Continued)

OTHER PUBLICATIONS

May 3, 2013, Search Report from European Patent Office in EP Application No. 13 001 233.9, which is the priority application to this U.S. application.

*Primary Examiner* — Sunil K Singh
*Assistant Examiner* — Michael Vitale
(74) *Attorney, Agent, or Firm* — Kolisch Hartwell, P.C.

(57) ABSTRACT

A vertical machining center in gantry construction may comprise a machine frame having two side walls configured to receive a tool-carrying assembly and a workpiece-carrying assembly, a moveable pickup tool magazine store within the two side walls of the machine frame configured for a tool change by the pickup method, and a machine enclosure which completely encloses the machining center. Below the moveable pickup tool magazine store there may be a free space in which there is additionally at least one further spare magazine, equivalent in construction to the pickup tool magazine store. A force-driven reloading handling system, with which machining tools can be reloaded from the spare magazine into the pickup tool magazine store and vice versa, may be provided within the machine enclosure at an access opening of the machine frame.

13 Claims, 4 Drawing Sheets

(52) U.S. Cl.
CPC ....... *B23Q3/15506* (2013.01); *B23Q 3/15706* (2013.01); *B23Q 3/15766* (2013.01); *Y10T 483/1717* (2015.01); *Y10T 483/1795* (2015.01); *Y10T 483/18* (2015.01); *Y10T 483/1845* (2015.01)

(56) References Cited

U.S. PATENT DOCUMENTS

| | | | |
|---|---|---|---|
| 3,312,370 A | | 4/1967 | Kolarich et al. |
| 3,546,774 A | * | 12/1970 | Holzl ................ B23Q 3/15526 29/54 |
| 4,185,514 A | * | 1/1980 | Edwards ................ F16H 1/16 74/421 A |
| 4,621,407 A | * | 11/1986 | Suzuki ................ B23Q 1/015 29/26 A |
| 5,107,581 A | * | 4/1992 | Reuter ............... B23Q 3/15526 483/61 |
| 5,762,594 A | * | 6/1998 | Hoppe ................ B23Q 3/155 409/224 |
| 2006/0194682 A1 | * | 8/2006 | Sugata ................ B23Q 1/626 483/3 |

FOREIGN PATENT DOCUMENTS

| | | |
|---|---|---|
| DE | 102009050174 B4 | 7/2011 |
| EP | 2295199 B1 | 3/2011 |
| JP | 1999-333655 A | 7/1999 |
| JP | 2007-315588 A | 12/2007 |

\* cited by examiner

VERTICAL MACHINING CENTRE IN GANTRY CONSTRUCTION

CROSS-REFERENCE TO RELATED APPLICATION

This application claims priority to European Patent Application No. 13001233.9, filed Mar. 12, 2013, which is hereby incorporated by reference.

BACKGROUND

The present disclosure relates to machining used in construction, namely in gantry construction.

SUMMARY

An embodiment of the present disclosure relates to a vertical machining centre in gantry construction, in particular for milling, drilling and/or turning machining by cutting, comprising a machine frame, having two side walls, for receiving a tool-carrying and a workpiece-carrying assembly, comprising a moveable pickup tool magazine store within the two side walls of the machine frame for a tool change by the pickup method, and comprising a machine enclosure which completely encloses the machining centre.

A machining centre of the aforementioned type is disclosed and illustrated in EP 2 295 199 B1 and in DE 10 2009 050 174 B4, each of which is hereby incorporated by reference.

Within the meaning of an embodiment of the present disclosure, the term "vertical machining centre in gantry construction" is understood to mean a 5-axis machining centre, in which during workpiece machining the three linear displacement movements (X-Y-Z) are carried out by the vertically orientated work spindle and the two rotary displacement movements (C-A) are carried out by the pivotable and rotatable workpiece table. As a result, workpieces can generally be machined much more effectively and precisely, since with simultaneous machining in all five spatial directions (X-Y-Z-C-A) the machining tool only has to be moved in the three linear spatial directions (X-Y-Z) and the workpiece only in the two rotary spatial directions. The field of use of vertical 5-axis machining centres in gantry construction ranges from general mechanical engineering through automobile construction to tool and mould construction and medical technology. As well as ferrous metals, non-ferrous metals or plastics materials may equally be machined.

Within the meaning of an embodiment of the present disclosure, the term "tool magazine store integrated into the machine" is understood to mean a tool magazine store for receiving and mounting a plurality of machining tools, which is arranged completely within the machine frame of the machining centre and thus does not take up any additional installation area outside the machine frame. The external dimensions of the machining centre in the two horizontal spatial directions (X-Y) thus do not have to be enlarged by the tool magazine store, which is completely integrated into the machine frame. In view of the very expensive installation area for a machining centre, this is a not insignificant economic consideration. Depending on the size of the machine frame in the horizontal spatial directions (X-Y), the tool magazine store which is completely integrated into the machine frame is configured for receiving approximately 30 to 50 machining tools. The larger the machine frame is in the horizontal spatial directions (X-Y) thereof, the larger the tool magazine store can be configured.

Within the meaning of an embodiment of the present disclosure, the term "tool change by the pickup method" is understood to mean a special tool change method in which the vertically orientated tool spindle can take up the machining tool directly from the tool magazine store and return it thereto without the aid of an external tool changing device. Tool change by the pickup method is a simple and reliable method, and therefore generally superior to the other known tool change methods.

Within the meaning of an embodiment of the present disclosure, the term "pickup tool magazine store" is understood to mean a tool magazine store for which tool change by the pickup method is possible.

Within the meaning of an embodiment of the present disclosure, the term "machine enclosure" is understood to mean a separating protective device which completely encloses the workstations in the machining centre. The machine enclosure protects the environment from flying chips, cooling lubricant particles and broken tool pieces which may result from a machine crash, and reduces the machining noise level outside the machine enclosure. Moreover, the machine enclosure prevents the operator from accessing the dangerous and very rapid feed and spindle movements of the tool spindle, the very rapid feed movements of the tool table and the very rapid positioning movements of the tool magazine store. So as to be able to access the workstations of the machining centre, the machine enclosure is provided with one or more access doors. The machine enclosure further comprises one or more viewing windows, through which it is possible to see into the workstations and optionally into the maintenance stations of the machining centre from the outside.

Within the meaning of an embodiment of the present disclosure, the term "workstation" is understood to mean the space in a machining centre where the workpieces are machined, in other words the space where the machining cuts are made. Further, the term "workstation" is also additionally understood to mean the space in a machining centre where the machining tools are stored and the tool reloading takes place. There may be one or more workstations in a machining centre, all of which need to be made accessible to the operator (worker) in an ergonomically expedient manner, in other words workstations with operator access.

In a machining centre of the aforementioned generic type, it is generally considered disadvantageous that the storage capacity of the tool magazine store in the machining centre is actually quite severely limited by the dimensions of the machine frame, in such a way that it is very often necessary to use an additional magazine set up in the machining centre. In particular for small and medium machining centres of the aforementioned generic type, the restriction on the storage capacity of the tool magazine store due to the machine frame has a very negative effect. Small and medium machining centres are to be understood as machining centres in which the displacement path of the tool spindle in the horizontal transverse direction (X-direction) is approximately between 300 mm and 800 mm. For the very complex and protracted machining tasks which have to be carried out nowadays, a plurality of different or equivalent tools are generally always required. An equivalent tool is understood as what is known as a spare tool. A spare tool is changed in from the tool magazine store into the tool spindle when a particular wear limit on the original machining tool has been exceeded, in such a way that machining is no longer possible with the original machining tool. A spare tool of this type is equivalent and identical to the original machining tool. This plurality of tools has to be provided by a tool magazine store having a sufficient storage capacity. Nowadays, 70 machining tools would not be unusual for a normal machining task.

Expanding the storage capacity of a machine-internal tool magazine store of the aforementioned type is illustrated and disclosed for example in EP 2 295 199 B1. By way of a storage expansion set up on the machine frame of the machining centre, the storage capacity of the machine-internal tool magazine store can indeed be greatly increased, but at the cost of an increased installation area for the machining centre. The storage expansion set up or installed on the machine frame noticeably increases the installation area for the machine frame and thus for the machining centre. Moreover, for the operation of the storage expansion, an additional, power-driven tool handling system of a complex construction is required in the storage expansion and thus outside the machining centre, so as to reload the machining tools from the storage expansion into the machine-internal tool magazine store or vice versa. This two-way reloading process also additionally takes up a considerable amount of time because of the relatively large dimensions of the storage expansion.

Another way of expanding the storage capacity of a machine-internal tool magazine store of the aforementioned type is illustrated and described in DE 10 2009 050 174 B4. In DE 10 2009 050 174 B4 [or DE 10 2009 050 717 B4], the tool magazine store integrated into the machine is arranged almost completely outside the U-shaped machine frame, in such a way that the storage capacity of the tool magazine store in the machining centre is now only limited very slightly by the dimensions of the U-shaped machine frame. However, the drawback of this solution is an increase in the installation area and the complication to the construction of the U-shape machine frame. In this case, the U-shaped machine frame has to be changed considerably from the aforementioned generic type of machine.

Thus, there is a typical conflict of aims. On the one hand, achieving an increased tool storage capacity requires more installation area and complex and time-consuming tool handling system for the tool reloading. On the other hand, the additional installation area and the additional complex and time-consuming tool handling system for the tool reloading makes the installation of the machining centre unnecessarily complicated. Further, because of the relatively long times for reloading the machining tools from the storage expansion into the machine-internal tool magazine store and vice versa, the machining process as a whole may be disrupted, for example possible waiting times during machining until an appropriate spare tool can be provided from the additional magazine for the changing process into the tool spindle.

Against this background, an object of an embodiment of the present disclosure is to develop the aforementioned machining centre, whilst maintaining the advantages thereof, in such a way that an increase in the storage capacity of the machine-internal tool magazine store is not accompanied by an increase in the installation area, in other words a storage expansion of the machine-internal tool magazine store should be possible without affecting the original installation area of the machining centre. The installation area has to stay the same with and without the storage expansion.

Further, the increase in storage capacity should not significantly affect the tool changing times, in other words a tool change should be carried out promptly without major movement sequences.

Further, the increase in the storage capacity of the machine-internal tool magazine store should be possible with a low complexity of construction and manufacture; in particular, the increase in storage capacity should not necessitate major constructional changes to the U-shaped machine frame.

This object of the present disclosure is achieved in an embodiment of a vertical machining centre in gantry construction, in particular for milling, drilling and/or turning machining by cutting, comprising a machine frame, having two side walls, for receiving a tool-carrying and a work-piece-carrying assembly, comprising a moveable pickup tool magazine store within the two side walls of the machine frame for a tool change by the pickup method, and comprising a machine enclosure which completely encloses the machining centre, in that below the pickup tool magazine store there is a free space in which there is additionally at least one further spare magazine, equivalent in construction to the pickup tool magazine store, and in that a force-driven reloading handling system, with which machining tools can be reloaded from the spare magazine into the pickup tool magazine store and vice versa, is provided within the machine enclosure at an access opening of the machine frame.

As a result of a configuration according to an embodiment of the present disclosure, the storage capacity of a machine-internal pickup tool magazine store can be expanded in machining centres of the aforementioned type, by a simple way, if at least one spare magazine comprising a force-driven reloading handling system at an access opening on the machine frame is arranged in the free space below the pickup tool magazine store. To some extent, this arrangement provides a multi-level, movable pickup tool magazine tower comprising a tool lift. The storage expansion of the type according to an embodiment of the present disclosure may have one or more of the following advantages: (a) the pickup tool magazine store is arranged completely within the machine frame; (b) at least one spare magazine, equivalent in construction to the pickup tool magazine store, is likewise arranged completely within the machine frame, below the pickup tool magazine store; and/or (c) the force-driven reloading handling system, by which machining tools can be reloaded from the machine-internal spare magazine into the machine-internal pickup tool magazine store and vice versa, is arranged at an access opening of the machine frame.

In accordance with an embodiment of the present disclosure, the pickup tool magazine store comprises a motor-driven tool magazine of annular construction comprising a magazine ring, which is rotatably mounted about a vertical axis and comprises tool holders for receiving machining tools.

In accordance with an embodiment of the present disclosure, the pickup tool magazine store can be driven by a motor comprising a gear reduction transmission.

In accordance with an embodiment of the present disclosure, the gear reduction transmission comprises a toothed belt stage and a gearwheel stage.

In accordance with an embodiment of the present disclosure, the rotatable magazine ring is connected to the machine frame via a four-point roller bearing.

In accordance with an embodiment of the present disclosure, the four-point roller bearing comprises an inner ring via which the four-point roller bearing is firmly connected, preferably screwed, to the machine frame.

In accordance with an embodiment of the present disclosure, the four-point roller bearing comprises a rotatable outer ring, on which the tool holders and a ring gear element for the gearwheel stage of the gear reduction transmission of the motor are arranged.

In accordance with an embodiment of the present disclosure, the spare magazine is connected to the rotatable magazine ring of the pickup tool magazine store positively and/or non-positively via a circular, annular adapter. This has the advantage that separate mounting and a separate drive for the spare magazine are not required.

In accordance with an embodiment of the present disclosure, the tool holders on the pickup tool magazine store and on the spare magazine are configured as resiliently deformable U-shaped holding brackets. With this type of tool receiver, the tool holder of the machining tool may be received and held positively and/or non-positively by the resiliently deformable U-shaped holding bracket. At the same time, with tool receivers of this type, some exertion of force is always required to push the machining tool comprising the tool holder into or out of the tool receiver.

In accordance with an embodiment of the present disclosure, the reloading handling system comprises a pneumatically adjustable 2-axis unit, comprising a vertical axis, a horizontal longitudinal axis arranged perpendicular thereto, and a tool gripper comprising two pneumatically adjustable gripping jaws for holding a standardised spherical tool shaft of a machining tool.

In accordance with an embodiment of the present disclosure, the vertical axis and the horizontal longitudinal axis are each formed by a pneumatic cylinder without a piston rod.

BRIEF DESCRIPTION OF THE DRAWINGS

Further details, features and advantages of one or more embodiments of the present disclosure may be taken from the following description by way of the drawings.

DETAILED DESCRIPTION

The vertical machining centre in gantry construction according to an embodiment of the present disclosure is used in particular as a multifunctional machining centre for milling, drilling and/or turning machining by cutting.

Figure 1:
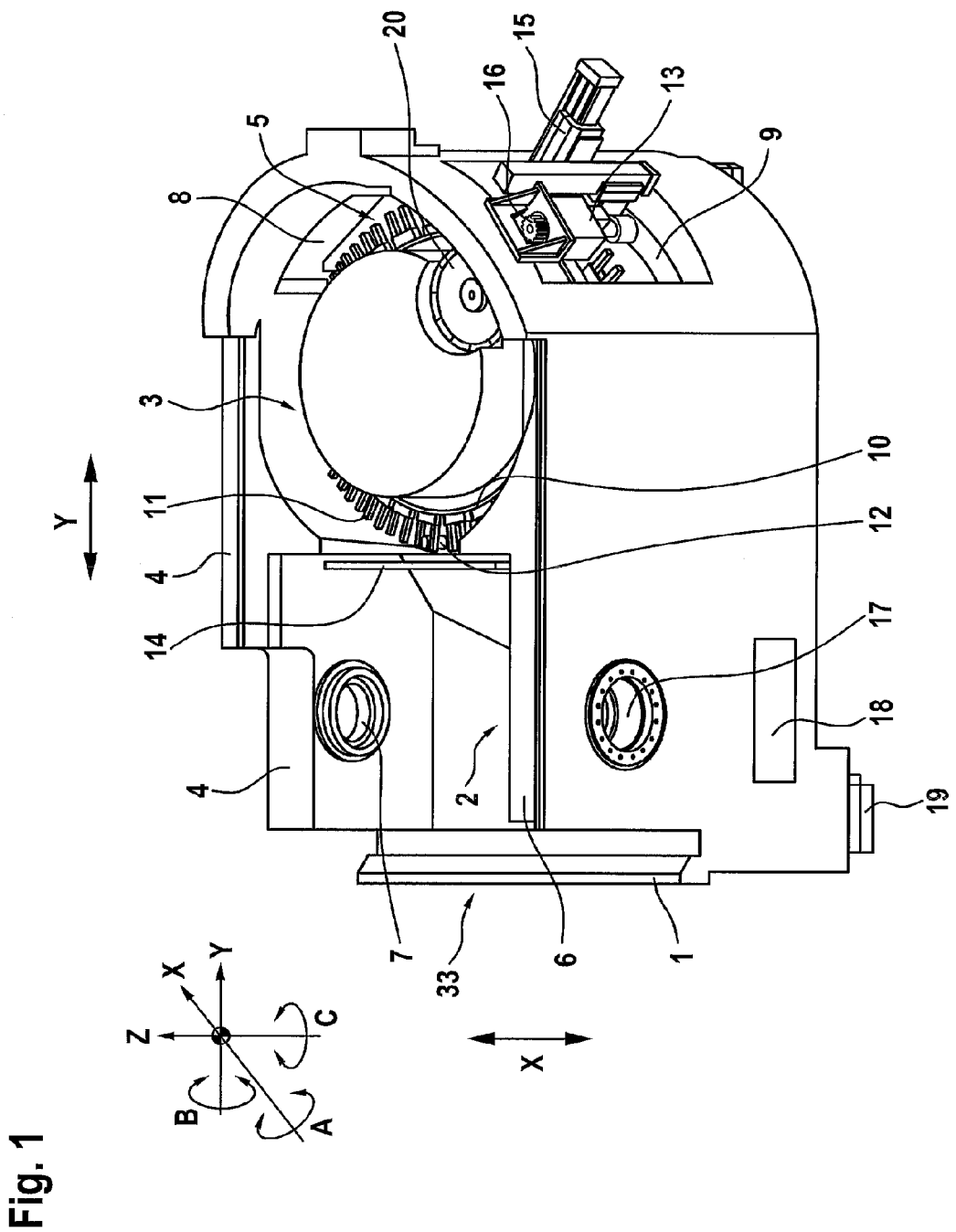
FIG. 1 is a perspective partial view of an embodiment of a machining centre according to the present disclosure from the side and from above.

With reference to FIG. 1, the machining centre comprises a substantially U-shaped machining frame 1 having two side walls 4, 6, which is mounted via 3-point mounting on vertically adjustable machine blocks 19 and serves to receive a tool-carrying assembly and a workpiece-carrying assembly. The tool-carrying assembly can be displaced controllably in three linear spatial directions (X-Y-Z) and serves to receive a vertically orientated tool spindle. The workpiece-carrying assembly can be displaced controllably in two rotational spatial directions (A-C) and serves to receive a workpiece table.

A receiver 7, 17 for the tool-carrying assembly and an access opening 18 for a chip conveyor are arranged in the side walls 4, 6 of the U-shaped machine frame 1. Further, a movable pickup tool magazine store 5 for a tool change by the pickup method is mounted within the two side walls 4, 6.

A force-actuated movable partition wall 14 is further provided in the machine frame 1, and is arranged between the workstation of the tool spindle 2 and the workstation of the tool magazine store 3. Moreover, a loading and unloading opening 33 for the workstation of the tool spindle 2 and a loading and unloading opening 8 for the workstation of the tool magazine store 3 are provided. The loading and unloading opening 8 makes manual loading and unloading of the pickup tool magazine store 5 possible.

The machine frame 1 is moreover surrounded by a machine enclosure, which completely encloses the machining centre.

Figure 2:
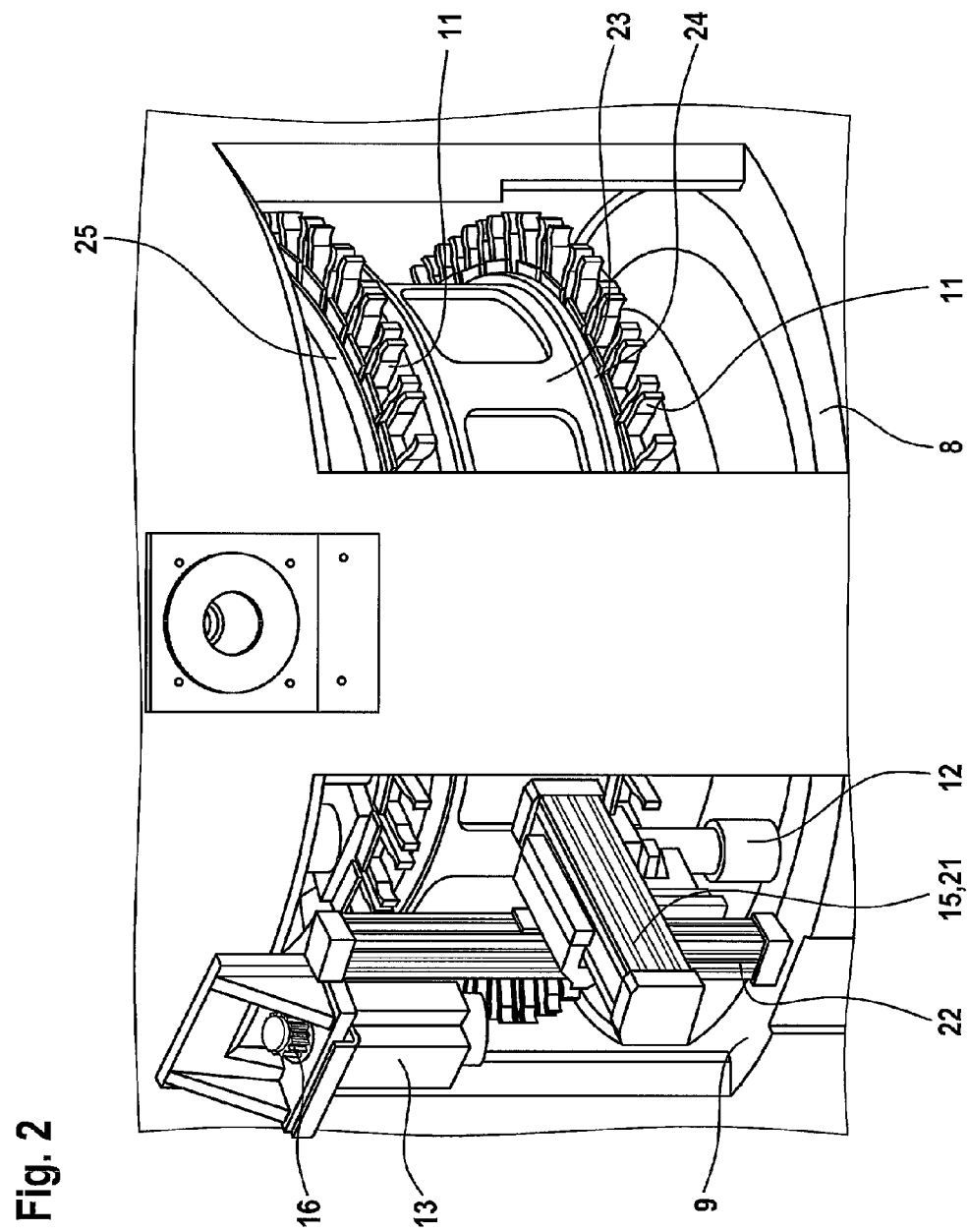
FIG. 2 is a perspective partial view of the machining centre of FIG. 1 from behind.

A free space, in which there is additionally at least one further spare magazine 24, equivalent in construction to the pickup tool magazine store 5, is provided below the pickup tool magazine store 5 (seen in FIG. 2).

The pickup tool magazine store 5 comprises a motor-driven tool magazine of a circular, annular construction, comprising a magazine ring 10, which is mounted rotatably about a vertical axis and provided with positive and/or non-positive tool holders 11 for receiving machining tools 12.

Figure 4:
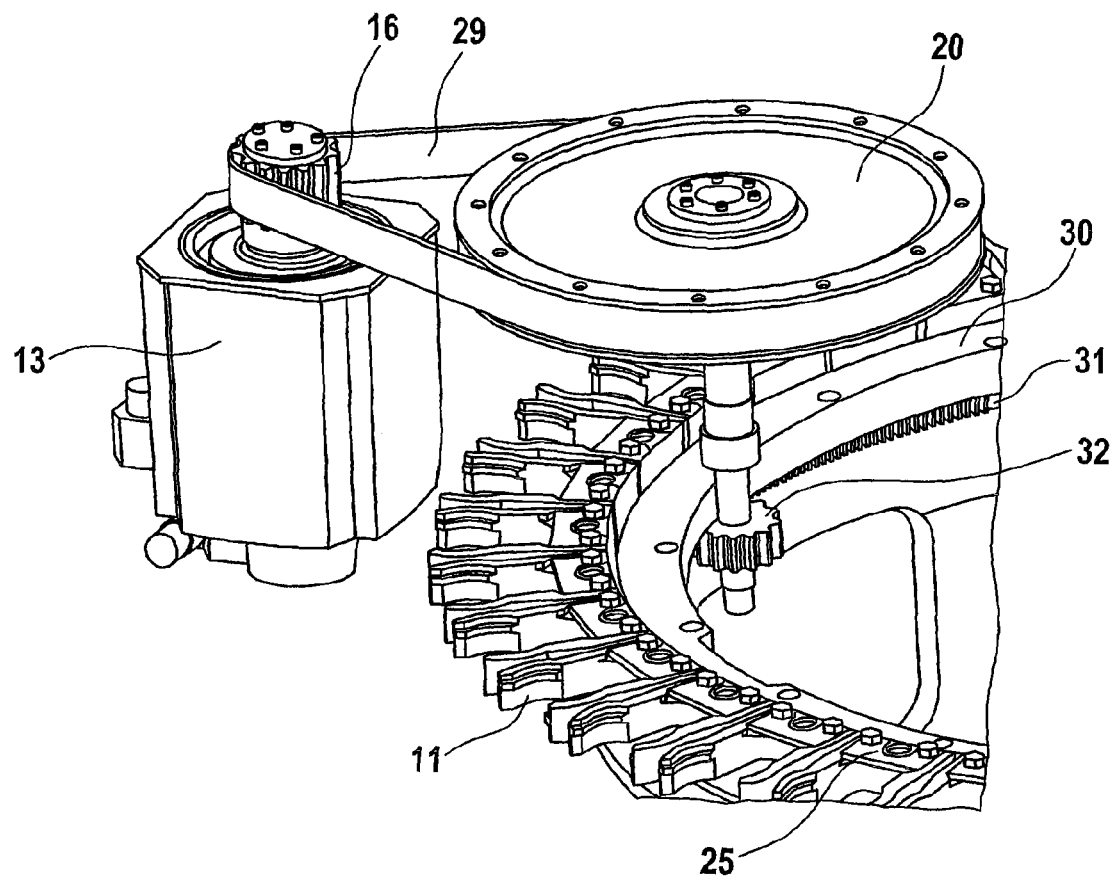
FIG. 4 is a detail of an embodiment of a drive of a magazine ring according to the present disclosure.

The pickup tool magazine store 5 or the magazine ring 10 thereof can be driven via a motor 13 comprising a gear reduction transmission. The gear reduction transmission comprises a toothed belt stage 16, 20, 29 and a gearwheel stage 31, 32, the toothed belt stage comprising a drive pinion 16, a driven toothed belt wheel 20 and a toothed belt 29, and the gearwheel stage comprise a gearwheel pinion 32 and a ring gear element 31 (seen in FIG. 4).

The rotatable magazine ring 10 is connected to the machine frame 1 of the machining centre via what is known as a four-point roller bearing. The four-point roller bearing comprises an inner ring 30 and a rotatable outer ring 25. The inner ring 30 is firmly screwed to the machine frame 1, whilst the tool holders 11 for receiving the machining tools 12 and a ring gear element 31 for the gearwheel stage of the gear reduction transmission of the motor 13 are located on the rotatable outer ring 25.

The spare magazine 24 is connected to the rotatable magazine ring 10 of the pickup tool magazine store 5 positively and/or non-positively via a circular, annular adapter 23, in such a way that separate mounting and a separate drive for the spare magazine 24 are not required.

The tool holders 11 for receiving the machining tools 12 on the pickup tool magazine store 6 and on the spare magazine 24 are configured as resiliently deformable U-shaped holding brackets. With this type of tool receivers, the tool holder 11 of the machining tool 12 is received and held positively and/or non-positively by the resiliently deformable U-shaped holding bracket. At the same time, with tool holders 11 of this type, some exertion of force is always required to push the machining tool 12 comprising the tool holder 11 into or out of the tool receiver.

A force-driven reloading handling system 15, with which machining tools 12 can be reloaded from the machine-internal spare magazine 24 into the machine-internal pickup tool magazine store 5 and vice versa, is provided within the machine enclosure at an access opening 9 of the machine frame 1.

Figure 3:
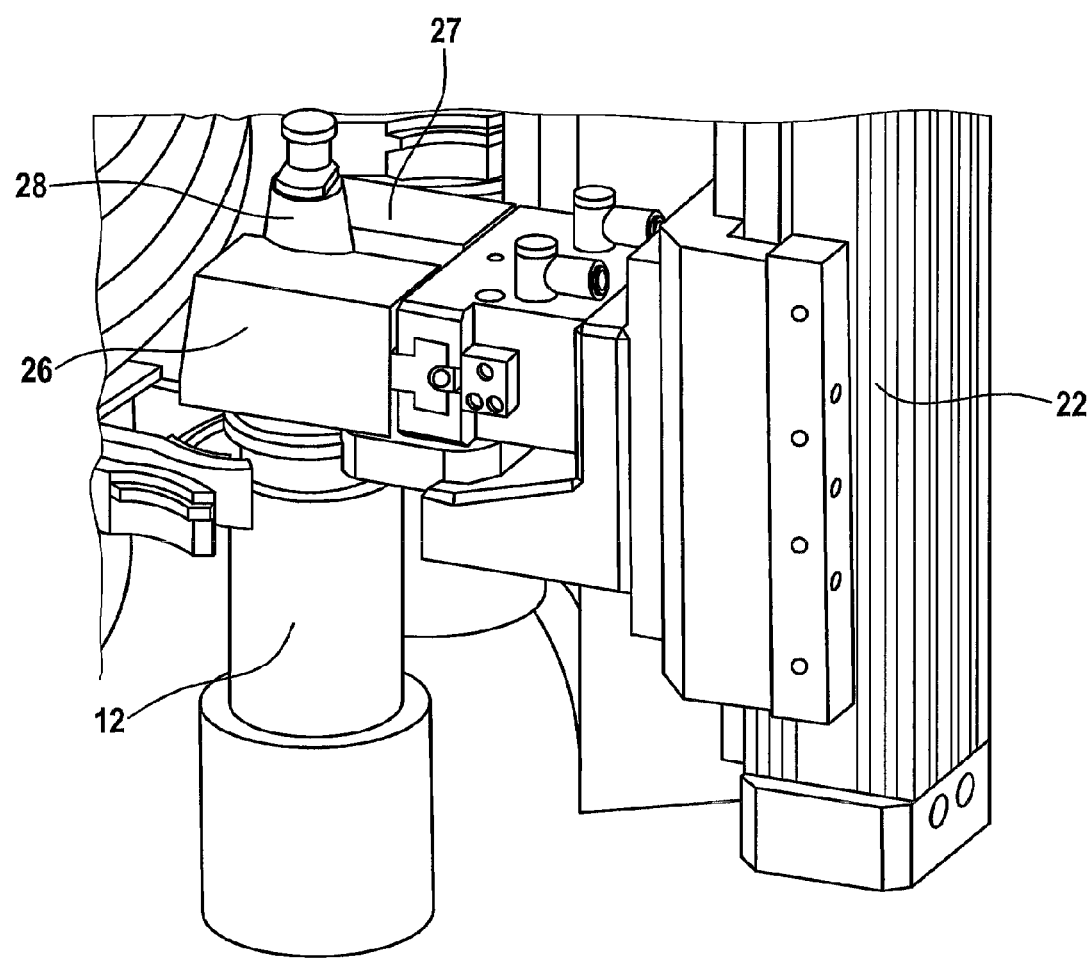
FIG. 3 is a detail of an embodiment of a reloading handling system according to the present disclosure.

The reloading handling system 15 comprises a pneumatically adjustable 2-axis unit, comprising a vertical axis and a horizontal longitudinal axis arranged perpendicular thereto, and a tool gripper comprising two pneumatically adjustable gripping jaws 26, 27 for holding a standardised spherical tool shaft 28 of a machining tool 12 (seen in FIG. 3). The vertical axis and the horizontal longitudinal axis may each be formed by a pneumatic cylinder 21, 22 without a piston rod.

An embodiment of the present disclosure relates to a vertical machining centre in gantry construction, in particular for milling, drilling and/or turning machining by cutting, comprising a machine frame, having two side walls, for receiving a tool-carrying and a workpiece-carrying assembly, comprising a moveable pickup tool magazine store within the two side walls of the machine frame for a tool change by the pickup method, and comprising a machine enclosure which completely encloses the machining centre. So as to develop the aforementioned machining centre, whilst maintaining the advantages thereof, in such a way that an increase in the storage capacity of the machine-internal tool magazine store is not accompanied by an increase in the installation area, in other words a storage expansion of the machine-internal tool magazine store should be possible without affecting the original installation area of the machining centre, the present disclosure provides that below the pickup tool magazine store there is a free space in which there is additionally at least one further spare magazine, equivalent in construction to the pickup tool magazine store, and that a force-driven reloading handling system, with which machining tools can be reloaded from the spare magazine (24) into the pickup tool magazine store and vice versa, is provided within the machine enclosure at an access opening of the machine frame.

One or more embodiments of the present disclosure may include one or more of the following concepts:

A. Vertical machining centre in gantry construction, in particular for milling, drilling and/or turning machining by cutting, comprising a machine frame (1), having two side walls (4, 6), for receiving a tool-carrying and a workpiece-carrying assembly, comprising a moveable pickup tool magazine store (5) within the two side walls (4, 6) of the machine frame (1) for a tool change by the pickup method, and comprising a machine enclosure which completely encloses the machining centre, characterised in that below the pickup tool magazine store (5) there is a free space in which there is additionally at least one further spare magazine (24), equivalent in construction to the pickup tool magazine store (5), and in that a force-driven reloading handling system (15), with which machining tools (12) can be reloaded from the spare magazine (24) into the pickup tool magazine store (5) and vice versa, is provided within the machine enclosure at an access opening (9) of the machine frame (1).

B. Vertical machining centre according to Paragraph A, characterised in that the pickup tool magazine store (5) comprises a motor-driven tool magazine of a circular, annular construction, comprising a magazine ring (10), which is mounted rotatably about a vertical axis and provided with positive and/or non-positive tool holders (11) for receiving machining tools (12).

C. Vertical machining centre according to Paragraph B, characterised in that the pickup tool magazine store (5) can be driven via a motor (13) comprising a gear reduction transmission.

D. Vertical machining centre according to Paragraph C, characterised in that the gear reduction transmission comprises a toothed belt stage (16, 20, 29) and a gearwheel stage (31, 32).

E. Vertical machining centre according to any one of the preceding Paragraphs, characterised in that the rotatable magazine ring (10) is connected to the machine frame (1) via a four-point roller bearing.

F. Vertical machining centre according to Paragraph E, characterised in that the four-point roller bearing comprises an inner ring (30), via which the four-point roller bearing is rigidly connected, preferably screwed, to the machine frame (1).

G. Vertical machining centre according to either Paragraph E or Paragraph F, characterised in that the four-point roller bearing comprises a rotatable outer ring (25), on which the tool holders (11) and a ring gear element (31) for the gearwheel stage of the gear reduction transmission of the motor (13) are arranged.

H. Vertical machining centre according to any one of the preceding Paragraphs, characterised in that the spare magazine (24) is connected to the rotatable magazine ring (10) of the pickup tool magazine store (5) positively and/or non-positively via a circular, annular adapter (23).

I. Vertical machining centre according to any one of the preceding Paragraphs, characterised in that the tool holders (11) on the pickup tool magazine store (6) and on the spare magazine are configured as resiliently deformable U-shaped holding brackets.

J. Vertical machining centre according to any one of the preceding Paragraphs, characterised in that the reloading handling system (15) comprises a pneumatically adjustable 2-axis unit, comprising a vertical axis and a horizontal longitudinal axis arranged perpendicular thereto, and a tool gripper comprising two pneumatically adjustable gripping jaws (26, 27) for holding a standardised spherical tool shaft (28) of a machining tool (12)

K. Vertical machining centre according to Paragraph J, characterised in that the vertical axis and the horizontal longitudinal axis are each formed by a pneumatic cylinder (21, 22) without a piston rod.

One or more embodiments of the present disclosure may include one or more of the following features, which correspond to reference numerals in the drawings:

1 Machine frame
2 Workstation of the tool spindle
3 Workstation of the tool magazine store
4 Side wall
5 Pickup tool magazine store
6 Side wall
7 Receiver
8 Loading and unloading opening
9 Access opening
10 Magazine ring
11 Tool holder
12 Machining tool
13 Motor
14 Partition wall
15 Reloading handing system
16 Drive pinion
17 Receiver
18 Access opening
19 Machine blocks
20 Driven toothed belt wheel
21 Pneumatic cylinder
22 Pneumatic cylinder
23 Adapter
24 Spare magazine
25 Outer ring
26 Gripping jaw
27 Gripping jaw 28 Tool shaft
29 Toothed belt
30 Inner ring
31 Ring gear element
32 Gearwheel pinion
33 Loading and unloading opening The above description of the present disclosure is merely for illustrative purposes, and does not serve to limit the invention. Various changes and modifications are possible without the context of the invention, without departing from the scope of the invention and of the equivalent thereof.

What is claimed is:

1. A vertical machining centre in gantry construction, comprising:
    a machine frame having two side walls,
    a moveable pickup tool magazine store within the two side walls of the machine frame configured for a tool change by the pickup method,
    wherein below the moveable pickup tool magazine store there is a free space in which there is additionally at least one spare magazine of a circular, annular construction, and
    further wherein a force-driven reloading handling system, with which machining tools can be reloaded from the at least one spare magazine into the pickup tool magazine store and vice versa, is provided at an access opening of the machine frame,
    wherein the pickup tool magazine store includes a motor-driven magazine of a circular, annular construction, having a magazine ring, which is mounted rotatably about a vertical axis and provided with tool holders for receiving machining tools, and wherein the rotatable magazine ring is connected to the machine frame via a four-point roller bearing,
    wherein the force-driven reloading handling system includes a pneumatically adjustable 2-axis unit, having a vertical axis and a horizontal longitudinal axis arranged perpendicularly thereto, and a tool gripper having two pneumatically adjustable gripping jaws configured for holding a spherical tool shaft of a machining tool, the tool gripper configured to move in a straight line path along each of the horizontal longitudinal axis and the vertical axis.

2. The vertical machining centre of claim 1, wherein the pickup tool magazine store can be driven via a motor including a gear reduction transmission.

3. The vertical machining centre of claim 2, wherein the gear reduction transmission has a toothed belt stage and a gearwheel stage.

4. The vertical machining centre of claim 3, wherein the four-point roller bearing includes an inner ring, via which the four-point roller bearing is rigidly connected to the machine frame.

5. The vertical machining centre of claim 4, wherein the four-point roller bearing includes a rotatable outer ring, on which the tool holders and a ring gear element for the gearwheel stage of the gear reduction transmission of the motor are arranged.

6. The vertical machining centre of claim 5, wherein the at least one spare magazine is connected to the rotatable magazine ring of the pickup tool magazine store via a circular, annular adapter.

7. The vertical machining centre of claim 6, wherein the at least one spare magazine is provided with tool holders and wherein the tool holders on the pickup tool magazine store and on the at least one spare magazine are configured as resiliently deformable U-shaped holding brackets.

8. The vertical machining centre of claim 7, wherein a first pneumatic cylinder without a piston rod extends along the vertical axis and a second pneumatic cylinder without a piston rod extends along the horizontal longitudinal axis.

9. The vertical machining centre of claim 1, wherein the tool gripper is configured to move along the horizontal longitudinal axis from a first horizontal position to a second horizontal position and to move along the vertical axis from a first vertical position to a second vertical position.

10. The vertical machining centre of claim 1, wherein the tool gripper moves along the horizontal longitudinal axis from a first horizontal position to a second horizontal position and moves along the vertical axis from a first vertical position to a second vertical position.

11. A vertical machining centre in gantry construction, comprising:
    a machine frame having two side walls,
    a moveable pickup tool magazine store within the two side walls of the machine frame configured for a tool change by the pickup method,
    wherein below the moveable pickup tool magazine store there is a free space in which there is additionally at least one spare magazine of a circular, annular construction, and
    further wherein a force-driven reloading handling system, with which machining tools can be reloaded from the at least one spare magazine into the pickup tool magazine store and vice versa, is provided at an access opening of the machine frame,
    wherein the pickup tool magazine store includes a motor-driven magazine of a circular, annular construction, having a magazine ring, which is mounted rotatably about a vertical axis and provided with tool holders for receiving machining tools,
    wherein the force-driven reloading handling system includes a pneumatically adjustable 2-axis unit, having a vertical axis and a horizontal longitudinal axis arranged perpendicularly thereto, and a tool gripper having two pneumatically adjustable gripping jaws configured for holding a spherical tool shaft of a machining tool, the tool gripper configured to move in a straight line path along each of the horizontal longitudinal axis and the vertical axis.

12. The vertical machining centre of claim 11, wherein the tool gripper is configured to move along the horizontal longitudinal axis from a first horizontal position to a second horizontal position and to move along the vertical axis from a first vertical position to a second vertical position.

13. The vertical machining centre of claim 11, wherein the tool gripper moves along the horizontal longitudinal axis from a first horizontal position to a second horizontal position and moves along the vertical axis from a first vertical position to a second vertical position.

* * * * *